United States Patent
Schmid et al.

(10) Patent No.: US 11,801,634 B2
(45) Date of Patent: Oct. 31, 2023

(54) DISPOSABLE 3D PRINTER CARTRIDGE

(71) Applicant: COOBX AG, Balzers (LI)

(72) Inventors: Marco Schmid, Balzers (LI); Dieter Schmid, Balzers (LI)

(73) Assignee: COOBX AG, Balzers (LI)

( * ) Notice: Subject to any disclaimer, the term of this patent is extended or adjusted under 35 U.S.C. 154(b) by 0 days.

(21) Appl. No.: 16/979,140

(22) PCT Filed: Mar. 6, 2019

(86) PCT No.: PCT/CH2019/050003
§ 371 (c)(1),
(2) Date: Sep. 8, 2020

(87) PCT Pub. No.: WO2019/169511
PCT Pub. Date: Sep. 12, 2019

(65) Prior Publication Data
US 2020/0398490 A1   Dec. 24, 2020

(30) Foreign Application Priority Data
Mar. 7, 2018 (CH) .................................. 00278/18

(51) Int. Cl.
*B29C 64/259* (2017.01)
*B29C 64/321* (2017.01)
(Continued)

(52) U.S. Cl.
CPC .......... *B29C 64/259* (2017.08); *B29C 64/112* (2017.08); *B29C 64/321* (2017.08);
(Continued)

(58) Field of Classification Search
CPC ... B29C 64/259; B29C 64/112; B29C 64/321; B29C 64/255; B29C 64/25; B33Y 10/00; B33Y 30/00; B33Y 70/00
See application file for complete search history.

(56) References Cited

U.S. PATENT DOCUMENTS

2007/0257055 A1* 11/2007 Scott ..................... B29C 64/106
222/71
2010/0035002 A1* 2/2010 Veress ................. B29C 35/0888
264/496
(Continued)

FOREIGN PATENT DOCUMENTS

WO   2016062739 A1   4/2016
WO   2017079774 A2   5/2017

*Primary Examiner* — Joseph S Del Sole
*Assistant Examiner* — Baileigh Kate Darnell
(74) *Attorney, Agent, or Firm* — MORRISS O'BRYANT COMPAGNI CANNON, PLLC

(57) ABSTRACT

The invention relates to a disposable 3D printer cartridge for inserting into an exposure device for producing an object which is constructed in additive layers, wherein the cartridge contains at least one polymerizable liquid, or a polymerizable liquid can be filled into the cartridge. The cartridge comprises: a first lower housing part, a second upper housing part which can be removed from the first housing part, a support platform which forms the lower face of the second housing part, the object constructed in additive layers being arrangeable on the exterior of the support platform during the construction of the object, and a construction element which corresponds to the base of the first housing part. The layers of the object can be polymerized on the inner face of the construction element, and the inner face of the construction element has a non-stick coating.

14 Claims, 2 Drawing Sheets

(51) Int. Cl.
*B33Y 30/00* (2015.01)
*B33Y 10/00* (2015.01)
*B33Y 70/00* (2020.01)
*B29C 64/112* (2017.01)

(52) U.S. Cl.
CPC .............. *B33Y 10/00* (2014.12); *B33Y 30/00* (2014.12); *B33Y 70/00* (2014.12)

(56) References Cited

U.S. PATENT DOCUMENTS

| | | | | |
|---|---|---|---|---|
| 2013/0089642 | A1* | 4/2013 | Lipson | B29C 64/106 426/115 |
| 2013/0209600 | A1* | 8/2013 | Tow | B29C 64/295 425/375 |
| 2018/0370136 | A1* | 12/2018 | Stadlmann | B29C 64/379 |
| 2021/0001541 | A1* | 1/2021 | Wattyn | B29C 64/124 |
| 2021/0023787 | A1* | 1/2021 | Busato | B33Y 30/00 |

\* cited by examiner

DISPOSABLE 3D PRINTER CARTRIDGE

CROSS-REFERENCE TO RELATED APPLICATIONS

This application is a national phase entry under 35 U.S.C. § 371 of PCT/CH2019/050003 filed Mar. 6, 2019, which claims priority to Swiss Patent Application No. 00278/18 filed Mar. 7, 2018, the entirety of each of which is incorporated by this reference.

FIELD OF INVENTION

The invention relates to a disposable 3D printer cartridge for inserting into an exposure device for producing an object which is constructed in additive layers, a system consisting of a disposable 3D printer cartridge and an exposure device, and a process for producing an object consisting of additive layers.

PRIOR ART

Additive manufacturing devices (3D printers) are used in more and more industries. This is due to the fact that complex shapes of products are simplified or even made possible in the first place compared to other manufacturing processes.

Additive manufacturing devices are also used in the medical field for producing objects with complex shapes. These objects include, for example, dental crowns, implants, etc.

If the object produced with the additive manufacturing device has to meet high hygienic requirements, problems arise because manufacture takes place in an open container. The polymerizable liquids required for production are taken from storage containers. When using several liquids, these liquids are mixed in the open. Sterile conditions during additive manufacturing are therefore difficult or impossible to adhere to. The additive manufacturing device must also be carefully cleaned after each use in order to meet the hygiene requirements.

The objects are produced from polymerizable liquids. The unused polymerizable liquid is often discarded or reused. From an economic and hygiene point of view, however, this procedure is disadvantageous.

SUMMARY OF THE INVENTION

The disadvantages of the described prior art are addressed by the present invention of improving additive manufacturing in such a way that the objects can be produced under improved hygienic and economic conditions. Another goal is to be able to process multi-component printing materials with a short processing time for the production of an object which is constructed in layers.

A disposable 3D printer cartridge for inserting into an exposure device for producing an object is constructed in additive layers in that the cartridge comprises:
  a first lower housing part,
  a second upper housing part which can be removed from the first housing part,
  a support platform which forms the lower face of the second housing part, the object constructed in additive layers being arrangeable on the exterior of the support platform during the construction of the object, and
  a construction element which corresponds to the base of the first housing part, wherein the layers of the object can be polymerized on the inner face of the construction element and the inner face of the construction element has a non-stick coating.

The cartridge can meet all the usual hygienic requirements that are placed on an object produced in additive layers. This is particularly important for medical products. These medical products include implants, dental prostheses or products of the chip industry, which must achieve clean room classes. All medical specifications relating to implants can be met. The cartridge contains all the essential elements that are required for the production of the object or the three-dimensional article which is constructed in additive layers. All elements contained in the cartridge are neatly sealed inside the cartridge and access is only provided when the object is produced. The cartridge is only opened by separating the second housing part from the first housing part.

By providing the construction element within the first housing part, the object can be constructed well protected within the cartridge. The construction element can be produced from the materials customary in 3D printing. The construction element comprises a separating membrane made of a non-stick material, from which the cured, polymerized object layers can easily be detached. It is particularly advantageous for the separating membrane to consist of perfluoroethylene propylene (FEP), since this material has an anti-adhesive effect on many polymerizable resins. The resins are curable by irradiation with a light source, in particular with a UV light source.

In one embodiment of the invention, the first housing part is a container which is open at the top and in which the second housing part is received. All elements of the second housing part are therefore well protected by the first housing part while the cartridge is stored and sealed. Even after opening the cartridge and during the production of the object, the first housing part surrounds the second housing part and protects the object from contamination and mechanical influences during production.

In another embodiment of the invention, a liquid reservoir is formed on the second housing part, which liquid reservoir is filled with at least one polymerizable liquid. The cartridge is filled and ready with the required amount and type of the at least one polymerizable liquid, wherein at least one liquid is stored in the cartridge for a long time and well protected. Therefore, only the amount of liquid mixture that is required for the construction of the object can be activated. Repeated unhygienic use of the cartridge is prevented by the limited amount of liquid.

In a further embodiment of the invention, an insertion space is provided on the second housing part, in which insertion space a liquid reservoir can be inserted. An external liquid reservoir can be inserted into the insertion space. The external liquid reservoir can, for example, be a blister bag which is pierced before use. By providing the insertion space, the cartridge is suitable for a wide variety of liquids and is particularly flexible in its application.

The liquid cartridge expediently has at least a first and a second receiving space into which a first and a second polymerizable liquid are filled, the lower ends of the receiving spaces opening into a mixing chamber and the support platform being interrupted by at least one inlet channel which is in fluid communication with the mixing chamber, said inlet channel opening into the first lower housing part, whereby the liquid mixture can be transferred into the lower housing part. These elements of the liquid reservoir make it possible for the liquids to be mixed only shortly before they are processed and then squeezed into the lower part of the housing as a finished mixture. In the lower housing part, the construction element is completely covered with the liquid mixture. It is conceivable to provide several inlet channels. As a result, the polymerizable liquids can be transferred unmixed or partially mixed into the lower housing between the support platform and the construction element, depending on the application.

The cartridge is expediently designed in one piece and has a predetermined breaking point at the transition from the first housing part to the second housing part. The cartridge is immediately ready for use by breaking the predetermined breaking point without further preparation and the two housing parts can be inserted into the exposure device.

It is also conceivable that the cartridge is designed in two pieces and the first and second housing parts are detachably connected to one another. The connection is detachable but sufficiently sealed so that the elements of the cartridge are well protected during storage.

In another embodiment of the invention, the first and second housing parts are connected with an expandable connecting element in the region of the transition from the first housing part to the second housing part. As a result of the connecting element, the interior space between the first and second housing parts remains closed from the environment even when the cartridge is opened and the object is produced (printed) in the interior space. The stretchable connecting element connects the two housing parts even if they are pulled apart while printing. The stretchable connecting element may be a bellows which is attached to the edges of the two housing parts facing one another. While the second housing part is moved upwards relative to the first housing part, the bellows can be pulled apart lengthways.

In a further embodiment of the invention, the exterior of the base of the first housing part is covered with a first removable protective cover. The construction element is therefore well protected and is only released for irradiation by the light source when required.

It has proven to be advantageous if the top of the second housing part is covered with a second removable protective cover. As a result, the liquid reservoir, in particular its plug or the insertion space, is protected from contamination and damage while the cartridge is not inserted.

The liquid cartridge expediently has at least one plug which enables the liquid to be squeezed out and closes the filling opening of the liquid reservoir. The plug enables the liquid space to be closed from above and the liquid to be completely removed from the liquid space.

The invention is also characterized in that the first housing part has a first holding element with which it can be held on the exposure device and which first holding element enables the structure element to be clamped on the exposure device. The first housing part may be connected to the first holding element in a form-fitting manner. For example, the first holding element is a projection which can be pushed into a groove of the exposure device. The construction element is aligned or adjusted relative to the support platform by the pretensioning of the construction element. In addition, the pretensioning of the construction element results in a flat printing surface and the cured layers of the object can be more easily detached from the construction element. After the cartridge has been used, it can be easily removed from the exposure device thanks to the form fit.

It is advantageous if the second housing part has a second holding element with which it can be held on the exposure device. The second housing part is fastened to a lifting device with the second holding element. The lifting device lifts the second housing part relative to the first housing part during the additive layer construction of the object. Just like the first housing part, the second housing part may be held in a form-fitting manner on the lifting device. As a result, the second housing part is quickly fastened to the lifting device and can be detached from the lifting device just as quickly.

Another aspect of the invention relates to a system consisting of a disposable 3D printer cartridge according to the above description and an exposure device into which the first and second housing parts can be inserted, the object constructed in additive layers being producible between the first and second housing parts on the support platform. The essential parts for producing the object are therefore contained in the cartridge. The light source required for curing the layers of the object is provided by the exposure device. The exposure device also comprises a lifting device with which the upper housing part can be lifted relative to the lower housing part. The exposure device also comprises at least one plunger with which the liquid can be squeezed out of the liquid reservoir into the lower housing part. The system enables the hygienic production of objects constructed in additive layers without the exposure device becoming soiled.

Another aspect of the invention relates to a disposable 3D printer cartridge for inserting into an exposure device having a construction element for producing an object which is constructed in additive layers, in which a liquid reservoir is formed on the cartridge, which liquid reservoir is filled with at least one polymerizable liquid or an insertion space is provided on the cartridge, in which insertion space a liquid reservoir can be inserted and in which cartridge a support platform is formed which forms the lower face of the cartridge, with the object constructed in additive layers being arrangeable on the exterior of the support platform. In this embodiment, the cartridge consists only of the second housing part. The elements of the first housing part, in particular the open container and the construction element which forms the base of the container, are part of the exposure device. This embodiment makes it possible that the unused liquid mixture can be used for the construction of another object which has lower hygienic requirements. With 3D printers, this embodiment makes it possible to provide a homogeneous printing material by mixing the polymerizable liquids in the second housing part.

Another aspect of the invention relates to a process for producing an object consisting of additive layers, comprising the following process steps:
  opening a disposable 3D printer cartridge according to the description above by separating the lower first housing part from the second upper housing part,
  fastening the first and the second housing parts in the exposure device,
  squeezing out the at least one polymerizable liquid from the second housing part into the first housing part using at least one plunger provided on the exposure device and
  gradual construction of the additive layers of the object by gradually increasing the distance between the first and second housing parts after curing a layer by exposure to light.

The process enables the object which is constructed in additive layers to be produced within the two housing parts in a protected manner. Since the required liquids curable under irradiation with light are already filled in the upper housing part, contamination of the object by filling in the liquids or other process steps open to the environment is reliably avoided. The cartridge is intended to be used only once to produce the object. The cartridge must be disposed of after use. Reuse of the cartridge, which also leads to contamination of the object, is therefore prevented.

In an embodiment of the invention, the at least one polymerizable liquid is squeezed out completely before the construction of the object or takes place simultaneously and synchronized with the construction of the layers of the object. In most cases, the at least one polymerizable liquid is first squeezed out into the lower housing part used as a container. The amount of liquid may be just sufficient to be able to construct the object. However, if the mixed liquid has a short processing time and is to be processed immediately after entering the lower housing part, it is advantageous to transfer the liquid "just in time" into the lower housing part. This means that the partial supply of polymerizable liquid is linked to the gradual lifting of the upper housing part relative to the lower housing part.

BRIEF DESCRIPTION OF THE DRAWINGS

Further advantages and features are apparent from the following description of two exemplary embodiments of the invention with reference to the schematic representations. Not to scale, the figures show in:

FIGS. 1 and 3 show a first embodiment of a disposable 3D printer cartridge, which is designated as a whole by the reference numeral 11.

DETAILED DESCRIPTION OF THE INVENTION

The cartridge 11 comprises a first lower housing part 13 and a second upper housing part 15. Before the cartridge 11 is inserted into an exposure device (not shown in the figures), the two housing parts 13 and 15 must be separated from one another. The cartridge 11 is hermetically sealed until it is used in the exposure device and is therefore particularly suitable for use under sterile conditions.

Figure 1:
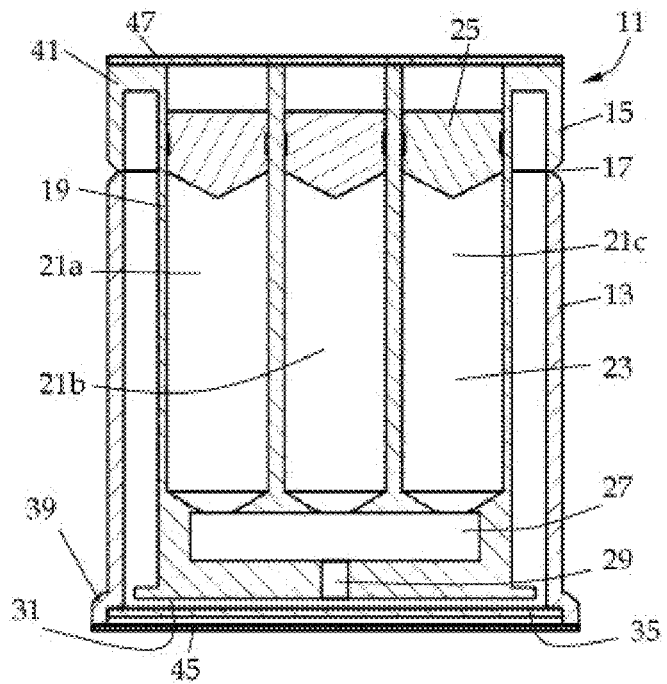
FIG. 1: a longitudinal section through a first embodiment of the disposable 3D printer cartridge according to the invention.
Figure 2:
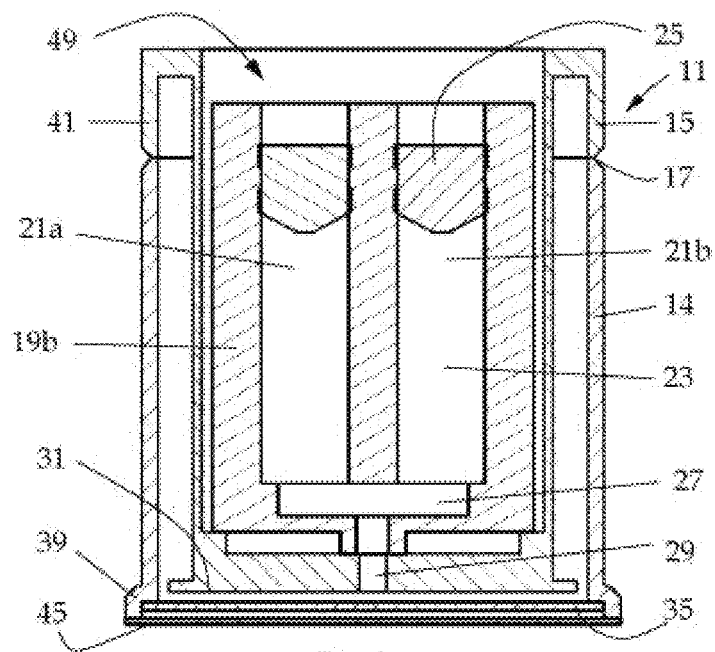
FIG. 2: a longitudinal section through a second embodiment of the disposable 3D printer cartridge according to the invention.

The two housing parts 13 and 15 are connected to one another at a predetermined breaking point 17 and can be separated at this point in order to make the cartridge 11 ready for use. The predetermined breaking point 17 can be provided in that the cartridge 11 is manufactured in one piece. The cartridge 11 may be produced by injection molding. If the first and second housing parts 13 and 15 are produced separately, they are detachably connected to one another so that the contents of the cartridge are sealed. As shown in FIGS. 1 and 2, the lower housing part 13 is container that is open at the top in which the upper housing part 15 is received.

Figure 3:
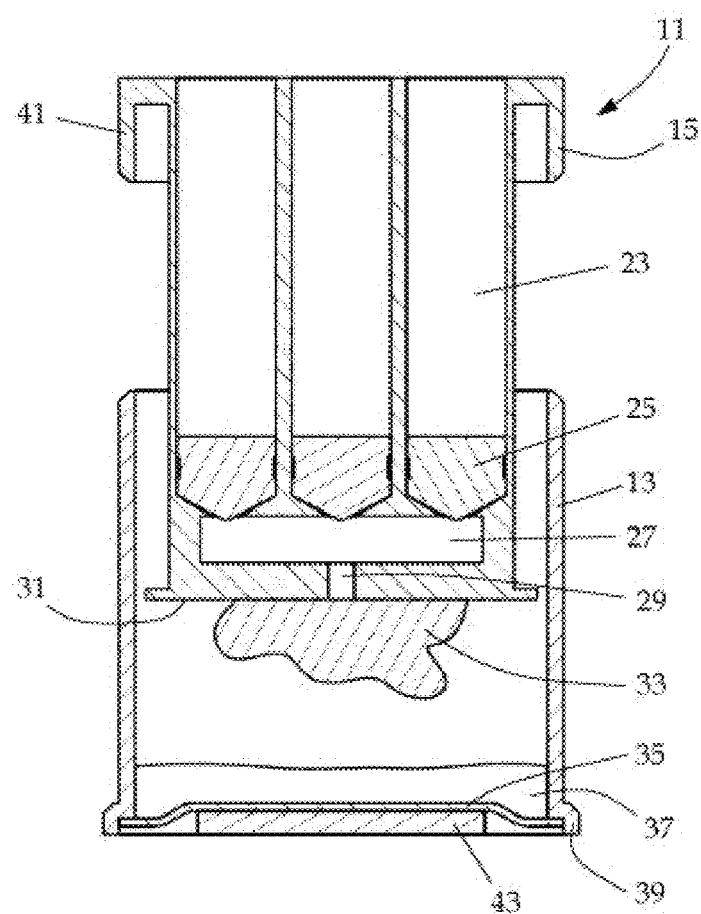
FIG. 3: a longitudinal section through the cartridge from FIG. 1 after producing an object which is constructed in additive layers.

According to the first embodiment of the cartridge (FIGS. 1 and 3), a liquid reservoir 19a is formed on the second upper housing part 15. In the figures, an embodiment of the liquid reservoir 19a is shown in which three different liquids 21a, 21b, 21c that are polymerizable under exposure to light, are filled in the receiving spaces 23 of the liquid reservoir 19a.

The liquids 21a, 21b, 21c can be pressed by plugs 25 into a mixing chamber 27 in which they can be activated by mixing. A static mixer, which mixes the liquids 21 homogeneously, can be provided in the mixing chamber 27. The liquids 21a, 21b, 21b can enter the lower housing part 13 through an inlet channel 29. The lower housing part 13 can therefore serve as a trough for the activated liquid mixture.

The lower face of the upper housing part 15 is formed by a support platform 31. On the exterior of the support platform 31, which faces the lower housing part 13, the layers of the object 33 to be produced are constructed.

The base of the lower housing part 13 is designed as a construction element 35 on which the layers of the object 33 can be polymerized. The construction element 35 or at least its inner face, which faces the second housing part 15, has a non-stick coating. As a result, the layers polymerized by exposure to light can be detached from the construction element 35 when the respective layer has cured.

It has been found to be particularly advantageous in the case of cartridge 11 that it comprises both the support platform 31 and the construction element 35. The object 33 is constructed in layers between the support platform 31 and the construction element. The object is therefore produced within the cartridge 11 between the lower housing part 13 and the upper housing part 15 by the so-called bottom-up process. This means that the object layers to be constructed are not constructed on the liquid surface (resin surface) but on the base of the lower housing part 13. Since the object is constructed by moving the upper housing part 15 upward away from the base of the lower housing part 13, it is sufficient if there is a small amount of mixed liquid (resin) 37 in the lower housing part 13. The base or the construction element 35 must be covered with resin so that the resin can flow in between the base and the object 33 at any time in order to construct a layer. The light source is arranged below the base, which is why the base or the construction element 35 must be transparent for the light. The light source 35 may be a UV light source.

For the upper housing part 15 to be moveable away from the lower housing part 13 during the production of the object 33, both housing parts 13, 15 can be fastened in the exposure device. For this purpose, a first holding element 39 is formed on the first lower housing part 13 and a second holding element 41 is formed on the second upper housing part 41.

With the first holding element 39, the lower housing part 13 can be held in the exposure device in such a way that the construction element 35 is pushed upwards by the light source 43 and is pretensioned. Due to the pretensioning of the construction element 35, the structure element 35 is aligned or adjusted relative to the support platform 31. The exact alignment of the construction element 35 enables the object 33 to be produced with very small dimensional tolerances. The pretensioning also facilitates the detachment of the respective cured layer from the construction element 35 after the irradiation with light.

The construction element 35 comprises a separating membrane. The separating membrane is constructed of a non-stick material, from which the cured, polymerized layers of the object can be easily detached. It is particularly advantageous if the separating membrane consists of perfluoroethylene propylene (FEP), since this material has a non-stick effect on many light-curable resins.

The second holding element 41 can be used to fasten the upper housing part 15 on the exposure device. The exposure device comprises a lifting device with which the second housing part 15 can be lifted relative to the first housing part, continuously, and can also be lowered again. Each time a layer of the object 33 has been cured at the light source by irradiation, the upper housing part 15 is lifted by the thickness of one layer after the object 33 has been detached from the construction element 35.

The exposure device also comprises at least one plunger with which the plug 25 can be pressed down in order to be able to squeeze out the liquid 21a, 21b, 21c from the receiving space 23 into the lower housing part 13.

The object can be produced under particularly hygienic conditions in that the cartridge 11 is only opened when the object 33 is produced, the necessary amount of liquids 21a, 21b, 21c has already been added and the object is produced within the cartridge 11. The cartridge 11 is provided as a disposable cartridge. After the production of the object 33 and its removal from the cartridge 11, the cartridge 11 is disposed of.

The two housing parts 13, 15 are each provided with a first and a second removable protective cover 45, 47 on their open sides. As a result, the cartridge 11 is hermetically sealed until it is used. The first and second protective covers 45, 47 must be removed before use. The first protective cover 45 protects the construction element 35, and the second protective cover 47 protects the liquid reservoir 19a or the plug 25 so that they are not accidentally pushed or contaminated before use.

FIG. 2 shows a second embodiment of the cartridge 11 in which a liquid reservoir 19b is not part of the second housing part 15, but is a separate part that can be inserted into an insertion space 49 provided on the second housing part 15. As a result, the cartridge 11 according to this second embodiment can be utilized with liquid reservoirs which are available separately.

Producing object 33 with the cartridge 11 takes place in the following process steps: First, the cartridge 11 is opened by breaking the predetermined breaking point 17 by twisting the upper housing part 15 relative to the lower housing part 13. As a result, the two housing parts 13, 15, which were previously hermetically connected, are separated from each other. The first and second protective covers 45,47 are removed from the housing parts 13,15 so that the cartridge 11 is ready for use.

When inserting the cartridge 11 into the exposure device, the upper housing part 15 continues to be received in the lower housing part 13 and is lifted only slightly. As a result, the support platform 31 and the construction element 35 continue to be protected during the insertion of the cartridge 11. By lifting, the upper housing part 15 can be connected to the lifting device in that the second holding element is connected to the lifting device. The lower housing part 13 is connected to the exposure device by the first holding element 39. In doing so, the construction element 35 is aligned by the light source 43.

The liquids 21a, 21b, 21c (light-curable resins) are now squeezed out from the liquid reservoir 19a or 19b into the lower housing part 13 using plungers. The plungers are provided on the exposure device and can be adapted to the number of receiving spaces 23 and the necessary displacement path of the plugs 25.

When the mixed liquids 37 cover the construction element 35, the additive construction of the layers of the object 33 is started. After curing a layer by irradiation with the light source 43, the upper housing part 15 is lifted from the lower housing part 13 by one layer thickness using the lifting device. The distance between the two housing parts 13, 15 is therefore increased during the construction of the object.

It is also conceivable that the liquid reservoir 19a or 19b is emptied synchronized with the layer construction and not before the layer construction. This can make sense if the liquids are only to be mixed very shortly before processing.

The disposable 3D printer cartridge 11 has a very high hygienic standard, since it is only opened shortly before producing the object 33 and is hermetically sealed before. In addition, it only contains the amount of curable liquids 21a, 21b, 21c that is required for producing the object 33. The cartridge 11 is disposed of after the article 33 has been produced, so that no further cleaning is necessary. A new, hygienically perfect cartridge 11 is therefore always used to produce the object 33.

The invention claimed is:

1. A disposable 3D printer cartridge for inserting into an exposure device for producing an object that is constructed in additive layers, wherein the cartridge contains at least one polymerizable liquid, or is configured to be filled with the at least one polymerizable liquid, the cartridge comprising:
a lower first housing part;
an upper second housing part configured to be separated from the first housing part for opening the cartridge for producing the object, the first housing part forming a container defining an opening at a top thereof in which the second housing part can be received;
a support platform forming a lower face of the second housing part, the object to be constructed in additive layers being positioned on an exterior side of the support platform during a construction of the object; and
a construction element that corresponds to a base of the first housing part, wherein the additive layers of the object are polymerized on an inner face of the construction element, and the inner face of the construction element includes a non-stick coating.

2. The cartridge according to claim 1, further comprising a fluid reservoir formed on the second housing part and which contains at the least one polymerizable liquid, or is configured to be filled with the at least one polymerizable liquid.

3. The cartridge according to claim 2, wherein the second housing part defines an insertion space in which the fluid reservoir can be inserted.

4. The cartridge according to claim 2, wherein the liquid reservoir defines at least a first receiving space configured to receive a first polymerizable liquid and a second receiving space, configured to receive a second polymerizable liquid, a first lower end of the first receiving space opening into a mixing chamber and a second lower end of the second receiving space opening into the mixing chamber, the support platform being interrupted by at least one inlet channel which is in fluid communication with the mixing chamber, the at least one inlet channel opening into the first housing part, whereby a liquid mixture of the first and a second polymerizable liquids can be transferred into the first housing part.

5. The cartridge according to claim 2, wherein the fluid reservoir includes at least one plug that enables the at least one polymerizable liquid to be squeezed out of the fluid reservoir and that closes a filling opening of the liquid reservoir.

6. The cartridge according to claim 1, wherein the cartridge is comprised of one piece and has a predetermined breaking point at a transition from the first housing part to the second housing part.

7. The cartridge according to claim 1, wherein the cartridge comprises two pieces with the first and second housing parts being detachably connected to one another.

8. The cartridge according to claim 1 wherein, the first and second housing parts are connected with an expandable connecting element in a region of a transition from the first housing part to the second housing part.

9. The cartridge according to claim 1, wherein an exterior of a base of the first housing part is covered with a first removable protective cover.

10. The cartridge according to claim 9, wherein a top of the second housing part is covered with a second removable protective cover.

11. The cartridge according to claim 1, wherein the first housing part has a first holding element configured to hold the first housing part on the exposure device and which first holding element enables the construction element to be clamped on the exposure device.

12. The cartridge according to claim 1, wherein the second housing part has a second holding element configured to hold the second housing part on the exposure device.

13. The cartridge according to claim 1, wherein the first and second housing parts are inserted into the exposure device, and wherein the object constructed in additive layers is produced between the first and second housing parts on the support platform.

14. A disposable 3D printer cartridge configured for insertion into an exposure device having a construction element for producing an object constructed in additive layers, wherein the cartridge contains at least one polymerizable liquid, or is configured to be filled with the polymerizable liquid, the cartridge, comprising:
- a lower housing part;
- an upper housing part configured to be separated from the lower housing part for opening the cartridge for producing the object, the lower housing part forming a container defining an opening at a top thereof in which the upper housing part can be received;
- a liquid reservoir formed in the cartridge and configured to be filled with the at least one polymerizable liquid, or wherein the cartridge defines an insertion space, the insertion space configured to receive the liquid reservoir with the insertion space; and
- a support platform formed on the cartridge that forms a lower face of the cartridge, the object constructed in additive layers being arrangeable on an exterior of the support platform.

\* \* \* \* \*